Aug. 20, 1968  T. F. THOMPSON  3,397,899
FIFTH WHEEL MOUNT
Filed Sept. 19, 1966  3 Sheets-Sheet 1

INVENTOR
THEODORE F. THOMPSON
BY Rudolph L. Lowell
ATTORNEY

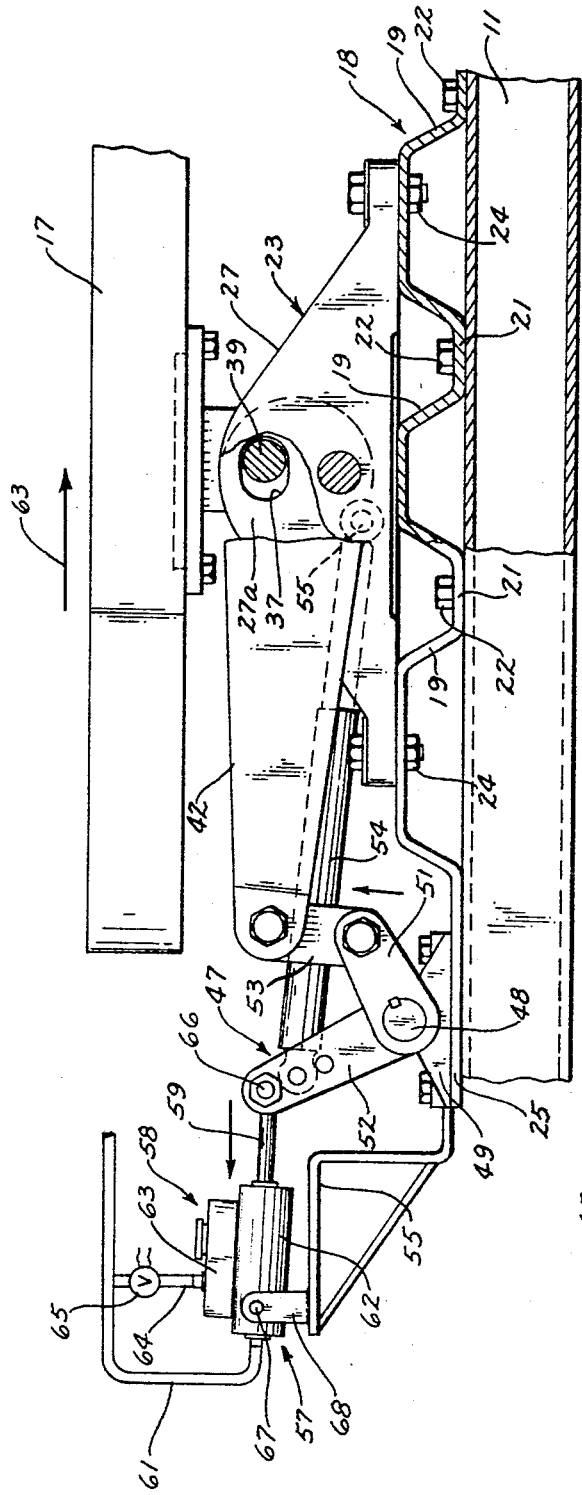
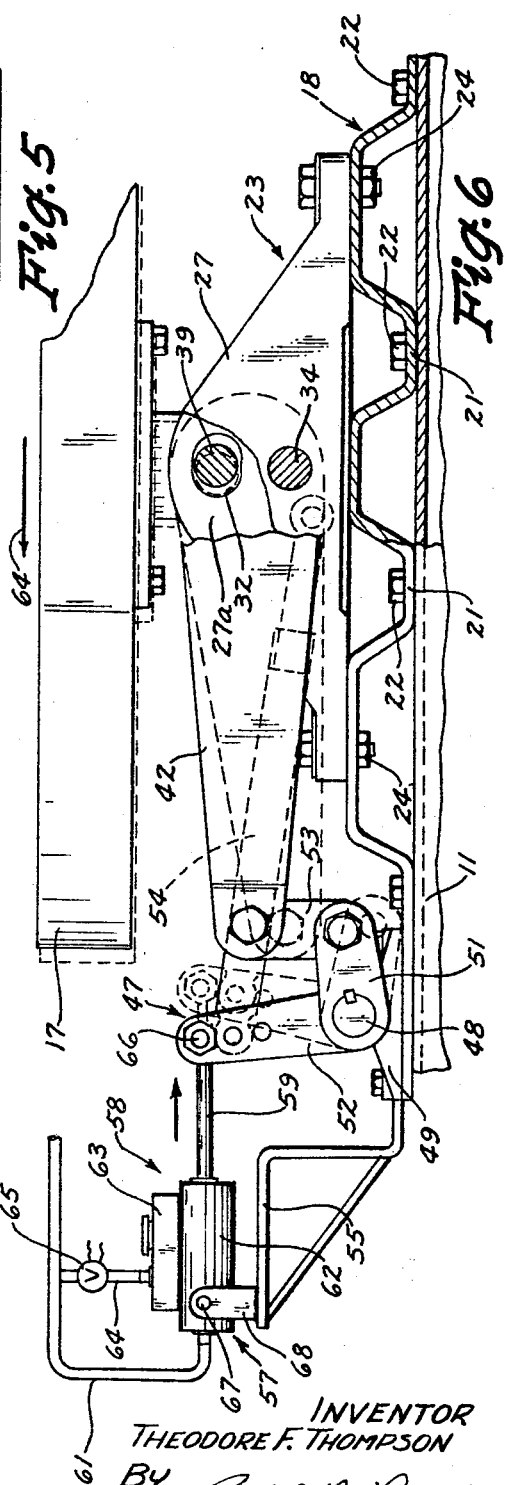

3,397,899
FIFTH WHEEL MOUNT
Theodore F. Thompson, 409 E. 12th St., Davenport, Iowa 52803
Filed Sept. 19, 1966, Ser. No. 580,460
2 Claims. (Cl. 280—432)

ABSTRACT OF THE DISCLOSURE

The fifth wheel mounting is for the purpose of automatically braking a semi-trailer in response to tractor braking to prevent the trailer from overriding the tractor. The mounting includes a base plate that is rigidly connected to the top side of the tractor frame for supporting a pair of longitudinally extended mounting brackets arranged in a transversely spaced relation and centered relative to the tractor rear axle assembly. A pair of upright transversely spaced load transfer members for supporting the fifth wheel are pivoted on the mounting brackets for pivotal forward and rearward movement. Each load transfer member has a rearwardly extended operating arm connected thereto that is movable forwardly and rearwardly in response to the pivotal movement of the load transfer members. This movement of the operating arms is transmitted to a combination stabilizing and force equalizing unit carried on the rear section of the base plate and is adapted to operate any conventional type control mechanism for actuating an electric, fluid or mechanical brake system on the trailer.

---

This invention relates to vehicle trailer hitch connections and in particular to a support structure for mounting the fifth wheel of a semi-trailer on a tractor frame to provide for an automatic operation of the brake system for an attached trailer.

As is well known a semi-trailer generally has a set of rear wheels, and a front end adapted for support on what is known as a "fifth wheel" which is mounted on a tractor or truck chassis at a position over the rear wheels. This fifth wheel provides for a pivotal movement of the trailer relative to the tractor at the connection therebetween to permit turning movements of the tractor-trailer combination.

Since a semi-trailer generally carries heavy loads, the rear wheels thereof are provided with a braking system which is operated in conjunction with the tractor braking system. The trailer brake system may be independently controlled by the tractor operator, conjointly with the operation of the tractor braking system, or automatically in response to relative movement between the tractor and trailer units.

An object of this invention is to provide a mounting for the fifth wheel of a tractor-trailer combination for automatically braking the trailer unit in response to a braking of the tractor unit to prevent the trailer from overriding the tractor.

A further object of this invention is to provide a fifth wheel mounting which includes a movable trailer load-transfer support arranged to actuate the trailer brake system in response to differential movement between the tractor and trailer units.

Still another object of this invention is to provide a fifth wheel mounting wherein a trailer load-transfer support is movable in a path parallel to the frame of the tractor whereby to assure a smooth braking action on the trailer during turning movements and a uniform pull or push on the fifth wheel mounting.

Yet another object of this invention is to provide a fifth wheel mounting wherein any force applied thereon by the trailer tending to twist the mounting is distributed to act equally on transversely opposite sides of the mounting so that an effective and controlled braking action of the trailer is obtained for substantially all draft conditions encountered during road travel.

A further object of this invention is to provide a fifth wheel mounting wherein a combination cushioning and stabilizing means prevents actuation of the trailer brake system in response to momentary overriding surge actions of the trailer relative to the tractor resulting from a travel of the combination unit over bumps, tar strips or undulations in the road surface.

Still another object of this invention is to provide a fifth wheel mounting which is efficient in operation to provide for an automatic braking of a trailer brake system to maintain the forward momentum or travel of the trailer at the same momentum of the tractor, is economical in cost and easily assembly on a tractor, and is of a sturdy lightweight construction.

Further objects, features and advantages of this invention will become apparent from the following description when taken in connection with the accompanying drawings in which:

FIG. 5 is a side view of the fifth wheel mounting, in partial section, taken along the line 5—5 in FIG. 1; and FIG. 6 is a view illustrated similarly to FIG. 5 showing the parts in relatively changed positions.

Figure 1:
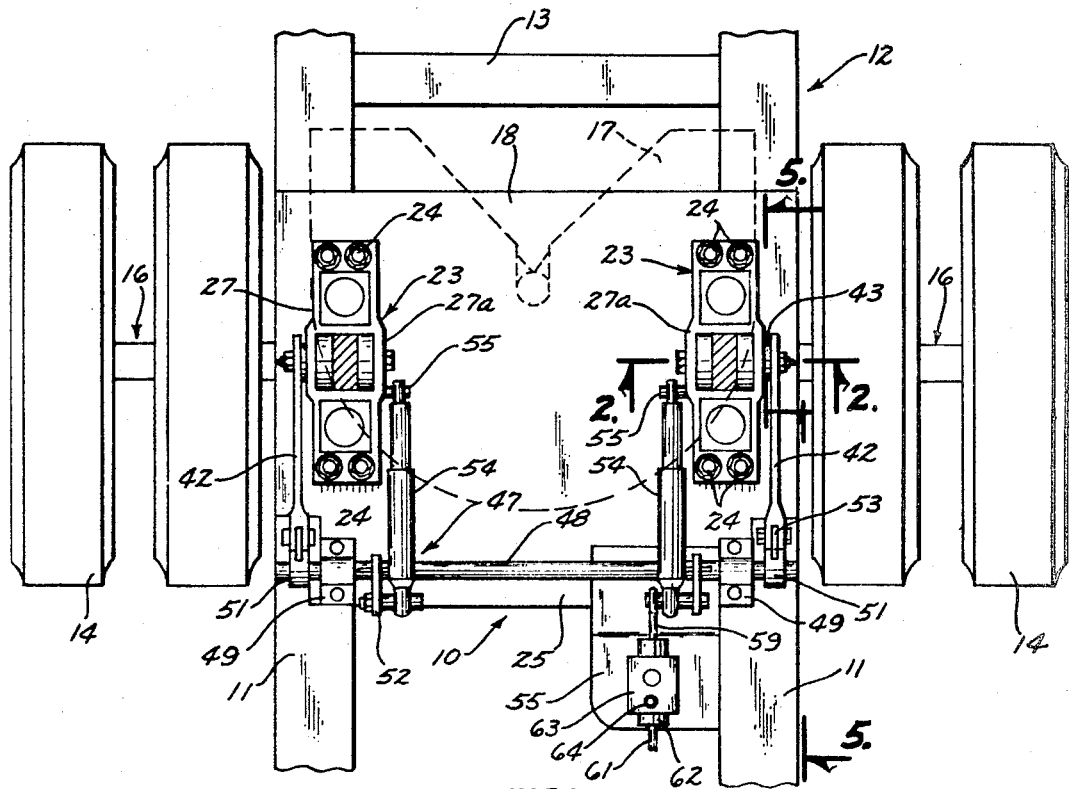
FIG. 1 is a top plan view of the fifth wheel mounting of this invention shown in assembly relation with the rear end portion of a tractor frame.

With reference to FIG. 1 of the drawing the fifth wheel mounting of this invention, indicated generally at 10, is shown mounted on the rear end portions of the longitudinal frame members 11 of a tractor frame 12. The frame members 11 are interconnected by transverse members 13 only one of which is illustrated. The rear tractor wheels 14 are carried on a usual axle assembly 16 connected in a conventional manner by a spring assembly (not shown) to the tractor frame 12. A fifth wheel 17 shown in broken lines in FIG. 1 and in full lines in FIG. 5 is supported, as is usual, in a centered relation relative to the spring assembly and axle assembly 16 to evenly distribute the weight of the trailer on such assemblies.

The fifth wheel mounting (FIGS. 1 and 5) includes a base plate 18 of a substantially square shape in plan view supported on the top sides of the tractor frame members 11 at a position between the rear wheels 14. The base plate 18 (FIG. 5) is formed with depressed reinforcing ribs 19 of a generally channel shape in transverse section which extend transversely of the frame members 11 in a longitudinally spaced relation. The ribs 19 have base sections 21 resting directly on the frame members 11 and secured to the frame member by bolt assemblies 22. For a purpose to appear later the base plate has a forward section 25 of a reduced width or transverse length.

A pair of longitudinally extended mounting brackets 23 (FIG. 1 and 5) are arranged in a transversely spaced relation on the base plate 18 at positions above a corresponding frame member 11 and centered relative to the tractor rear axle assembly 16. Bolt assemblies 24 located between certain of the reinforcing ribs 19 secure the brackets 23 to the base plate 18.

Figure 4:
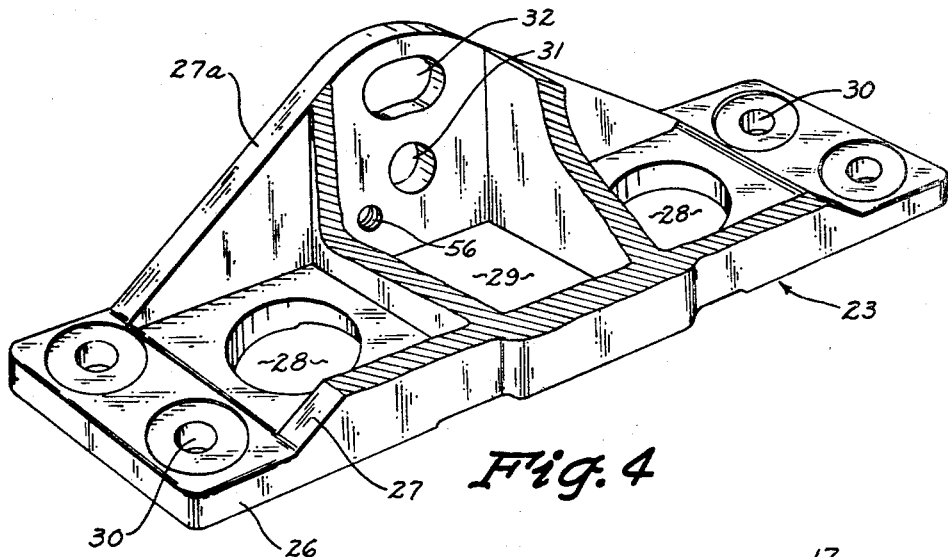
FIG. 4 is a detail perspective view of a mounting bracket which forms part of the fifth wheel mounting of this invention, with parts broken away for the purpose of clarity.

Each bracket 23 (FIG. 4) is of a U-shape in tranverse section having a base 26 and a pair of upright legs or side walls 27 and 27a. The base 26 is formed with a pair of longitudinally spaced circular openings 28 and an intermediate or center opening 29 of a square shape for weight reducing purposes. Holes 30 for the bolt assemblies 24 are provided at opposite ends of a bracket base 26.

The side walls 27 and 27a are formed in longitudinally centered positions thereof with a pair of vertically spaced openings 31 and 32. Each lower opening 31 is of a circular shape with a corresponding upper opening 32 being of an arcuate shape generated on a radius having a center coincident with the center of the lower opening 31.

Figure 2:
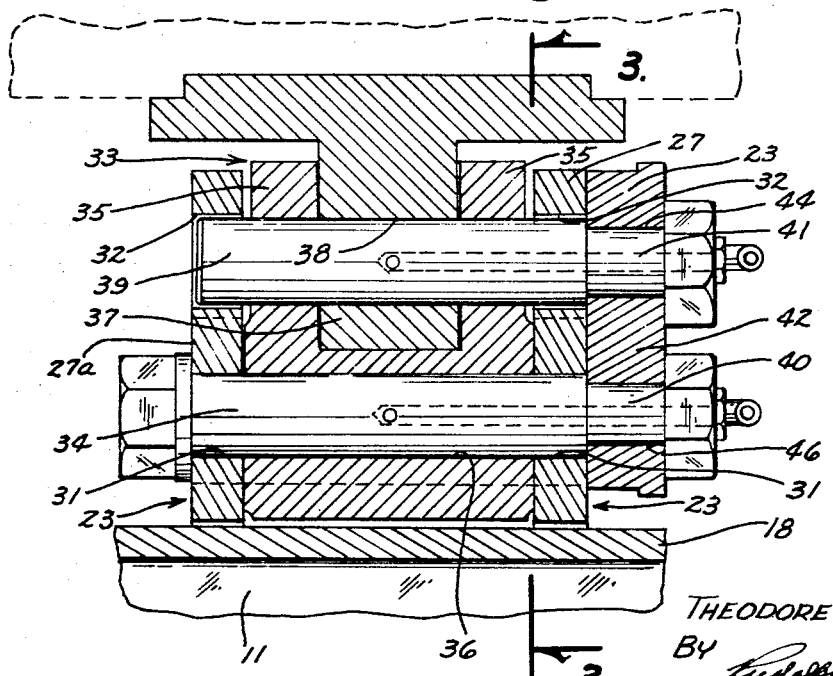
FIG. 2 is an enlarged detail sectional view of a support structure forming part of the fifth wheel mounting as seen along line 2—2 in FIG. 1.
Figure 3:
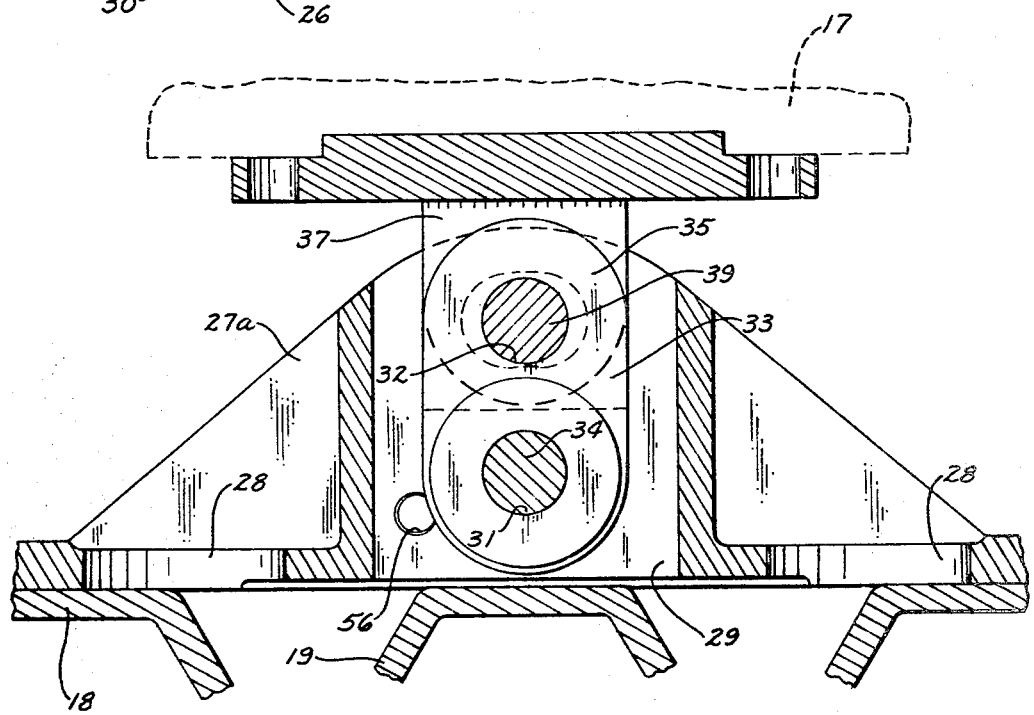
FIG. 3 is a sectional view of the support structure as seen on the line 3—3 of FIG. 2.

Located between and pivotally carried on the side walls 27 and 27a (FIGS. 2 and 3) of each bracket 23 is an upright link or load-transfer member 33 the upper end of which is bifurcated to form a pair of transversely spaced arms 35. A load-transfer shaft 34 is extended through the openings 31 in the side walls 27 and 27a and through a bore 36 in the lower end of an upright link 33. With the side walls 27 and 27a at the openings 31 forming a bearing support for the shaft 34, the link 33 is pivotally supported for forward and rearward movement relative to the tractor frame 12.

The fifth wheel 17 (FIGS. 2 and 5) has secured to its underside a pair of transversely opposite depending legs or projections 37 each of which is formed adjacent the lower end thereof with a transversely extended bore 38. The legs 37 are spaced a distance apart providing for the reception of each thereof between the arms 35 of a corresponding upright link 33. A connecting shaft 39 carried in the arms 35 and extended through a bore 38 pivotally connects each depending leg 37 with an upright link 33. The opposite end portions of a shaft 39 as best appears in FIG. 2 extend loosely within the arcuate openings 32 of the side walls 27 and 27a of a mounting bracket 23.

It is seen therefore that the load carried by the fifth wheel 17 is transferred from the depending legs 37 and through a shaft 39 to an upright link 33, and from such link the load is transferred to a supporting shaft 34 for application to the shaft bearings provided by the openings 31 in the mounting bracket side walls 27 and 27a. As a result, and for a purpose to appear later, there is no transfer of load from the fifth wheel 17 to the bracket 23 at the bracket openings 31. In other words a shaft 39 is idly movable back and forth within the openings 31 between limits defined by the engagement thereof wtih opposite ends of the openings 31.

The shafts 34 and 39 (FIG. 2) have reduced end sections 40 and 41, respectively, projected laterally outwardly from the side wall 27 of a mounting bracket 23. An operating arm 42 (FIGS. 1 and 2) associated with each bracket 23 and extended forwardly from a bracket 23 has a hub portion 43 formed with openings 44 and 46 for receiving the corresponding reduced shaft sections 40 and 41. Each shaft section 40 and 41 is suitably secured as by a key (not shown) with the hub portion 43 of an operating arm 42. As a result each pair of shafts 34 and 39 and a corresponding arm 42 are pivotally movable as a unit relative to the axis of the shaft 34 in response to the pivotal movement of an upright link 33 about the shaft 34.

The pivotal movement of the operating arms 42 is transmitted to a combination stabilizing and force equalizing unit, generally indicated at 47, and carried on the forward section 25 of the base plate 18 (FIGS. 1 and 5). This combination unit includes a rock shaft 48 extended transversely of the base plate 18 at a position forwardly of the front ends of the operating arms 42 with the ends thereof rockably spported in bearings 49 secured to the base plate section 25. Opposite ends of the shaft 48 project outwardly from the bearings 49 and carry rock arms 51. Arranged inwardly of the bearings 49 and mounted on the shaft 48 are rock arms 52. Each set or pair of adjacent rock arms 51 and 52 thus constitutes a bell crank unit having arm portions 51 extended upwardly and rearwardly and arm portions 52 extended upwardly and forwardly.

The free end of an operating arm 42 is connected by a pivoted link 53 to the rear end of a rock arm 51. An elongated cushioning unit or shock absorber 54 has one end pivotally connected adjacent the free end of a rock arm 52 and its opposite end pivotally connected to a stub shaft 55 received within an opening 56 (FIG. 4) formed in the side wall 27a of a mounting bracket 23 so as to project laterally inwardly from a side wall 27a.

One of the rocker arms 52 is connectable to any convenient type control mechanism 57 for actuating electric, fluid or mechanical brakes of the trailer in response to a pivotal movement of the operating arms 42. As shown in FIGS. 1 and 5 this mechanism 57 includes a combination master cylinder and reservoir unit 58 of a commercially available type having an actuating piston rod 59 projected from one end thereof. The mechanism 57 is carried on a forwardly extended mounting plate 55 secured to the base plate section 25. An oil pressure supply line 61 is connectable to the oil circuit of a hydraulic trailer brake system. Fluid connected to the supply line 61 and to the reservoir 63 of the unit 58 is a by-pass line 64 provided with a normally closed solenoid operated valve 65. The free end of the piston rod 59 is pivotally connected to a rocker arm 52 by a pivot pin 66. The end of the cylinder 62 remote from the piston rod 59 is pivotally mounted for pivotal movement about an axis, indicated at 67, extended transversely of the longitudinal axis of the cylinder 62, by stub shafts projected diametrically from the cylinder 62 and carried in brackets 68 mounted on the plate 55.

In the operation of the fifth wheel mounting 10 assume that the trailer is being towed at a constant road speed. Under this condition the operating arm 42 is in its position shown in FIG. 6 with a shaft 39 located substantially centrally of the arcuate openings 32. In response to any relative movement between the tractor and trailer, commonly referred to as a surge action, and resulting from a travel of the combination unit over tar strips or similar unevenness of a road surface the trailer will act to alternately drag or override the tractor. This surge action is transmitted to an upright link 33 so as to pivotally oscillate the link relative to the axis of the shaft 34. Since a shaft 39 pivots with a link 33, the pivotal oscillation of a link is transmitted to an operating arm 42. This pivotal movement of the arms 42 is cushioned or yieldably resisted by the shock absorbers 54 so as to be limited in scope to an extent incapable of operating the trailer brake control mechanism 57. As a result the surge action merely vacillates a shaft 39 back and forth relative to its center position within the arcuate openings 32 without having any effect on the trailer brake system. In other words the retarding action of the shock absorbing units 54 prevents an operation of the trailer brake system except when a sustained force or push is applied by the trailer against the tractor.

Should the tractor be accelerated, or the trailer started from a stopped position, the trailer tends to pull away from the tractor. The trailer thus pulls back on the fifth wheel 17, in the direction indicated by the arrow 64 in FIG. 5, whereby the upright links 33 are pivoted rearwardly to in turn pivot the operating arms 42 upwardly against the action of the cushion members 54 to their positions shown in FIG. 5. Any further upward movement of the arms 42 is prevented by engagement of the shafts 39 with the rear ends of the arcuate openings 32, as is also shown in FIG. 5. By virtue of the interconnection of the arms 42 with the piston rod 59 of the control mechanism 57 the rod 59 is merely moved forwardly without effecting any actuation of the trailer brake system.

With the tractor operated in a forward direction and the brakes thereon are applied the trailer acts to override the tractor in the direction indicated by the arrow 64 in FIG. 6. As a result of this overriding action the upright links 33 are pivoted forwardly whereby the operating arms 42 are pivoted downwardly against the resistance of the cushion members 54 to extreme positions limited by the engagement of the shafts 39 with the forward ends of the arcuate openings 32 as shown in dotted lines in FIG. 6. The piston rod 59 for the mechanism 57 through the rock shaft assembly is moved forwardly to a position providing for an automatic application of the trailer brakes.

In backing up the tractor and the trailer, the trailer tends to override the tractor so that the control mechanism 57 must be rendered ineffective to operate the trailer brake mechanism. In a back-up operation, therefore, the normally closed solenoid valve 65 is opened, by a manually actuated switch in the tractor cab or in response to the movement of the gear shift lever of the tractor to a reverse position therefor. With the valve 65 open the oil in the pressure line 61 will be by-passed through the by-pass line 64 to the reservoir 63. As a result the trailer brake system will not be applied during a back-up operation.

It is also apparent that should a twisting force be applied to one side of the fifth wheel mounting 17 by the trailer during a turning movement or the like such twisting force will be equalized over the mounting 17 through the interconnection of the operating arms 42 with the rocker arm assembly. By this interconnection the arms 42 are synchronized for pivotal movement in unison. The twisting force is thus distributed equally over the rocker arm assembly for a smooth actuation of the control mechanism 57.

By virtue of the shafts 39 being movable in a clearance relation within the openings 32 and with the operating arms 42 keyed to the shafts 34 and 39, the trailer load at no time is directly applied to or counteracted by the arms 42. As a result the arms 42 may be a relatively lightweight construction since they primarily coast with the rocker assembly to provide for the forces acting on the fifth wheel being equally distributed on the fifth wheel mounting in a direction parallel to the truck frame for resultant application to the control mechanism 57.

Although the invention has been illustrated and described relative to a preferred embodiment thereof it is to be understood that it is not to be so limited since changes can be made which are within the full intended scope of the invention as defined by the appended claims.

I claim:
1. A fifth wheel mount for mounting on a trailer frame for support of a trailer vehicle comprising:
 (a) a support structure carried on said frame,
 (b) an upright means for transferring the load from the fifth wheel to said support structure,
 (c) pivot means on said support structure supporting said upright means for forward and rearward pivotal movement,
 (d) an operating arm secured at one end to said upright means for up and down pivotal movement of the free end thereof in response to pivotal movement of said upright means,
 (e) means on said support structure interconnected with the free end of said operating arm to yieldably resist the pivotal movement of said arm,
 (f) means interconnecting said free end of the arm with a brake system for the trailer vehicle to actuate the brake system in response to the pivotal movement of the arm,
 (g) said yieldable resisting means including a rock shaft rockably mounted on said support structure rearwardly of and extended normal to said operating arm,
 (h) a shock absorbing unit, and
 (i) a bell crank adjacent each end of said rock shaft, each crank having a first portion pivotally connected to the free end of said operating arm, and a second portion pivotally connected to one end of said shock absorbing unit, with the opposite end of said unit pivotally connected to said support structure.

2. A fifth wheel mount for mounting on a tractor frame for support of a trailer vehicle as defined in claim 1 including:
 (a) a control mechanism for the trailer brake system secured to said support structure,
 (b) means connecting the second portion of said bell crank with the control mechanism, and
 (c) coacting means on said support structure and upright means for limiting the pivotal movement of said operating arm between positions providing for the release and application of the trailer brake system by said control mechanism.

References Cited
UNITED STATES PATENTS

| | | | |
|---|---|---|---|
| 2,916,107 | 12/1959 | Huentelman | 188—112 |
| 2,976,964 | 3/1961 | Thompson | 188—112 |
| 3,175,649 | 3/1965 | Kirk et al. | 188—112 |
| 3,180,454 | 4/1965 | De Angelis et al. | 188—112 |

BENJAMIN HERSH, *Primary Examiner.*

J. SIEGEL, *Assistant Examiner.*